United States Patent [19]

Greatbatch

[11] 4,106,791

[45] Aug. 15, 1978

[54] COUPLING DOLLY

[76] Inventor: Robert Johnson Greatbatch, 2 Holmlea, Quadring Road, Gosberton, Spalding, Lincolnshire, England

[21] Appl. No.: 722,613

[22] Filed: Sep. 13, 1976

[30] Foreign Application Priority Data

Sep. 13, 1975 [GB] United Kingdom ............... 37709/75

[51] Int. Cl.² ............................................... B62D 53/06
[52] U.S. Cl. .............................. 280/423 A; 280/476 R; 280/492
[58] Field of Search ........... 280/423 A, 423 R, 405 R, 280/405 A, 405 B, 415 B, 492, 493, 479 A, 476 R

[56] References Cited

U.S. PATENT DOCUMENTS

| 1,590,582 | 6/1926 | Johnson | 280/492 |
| 2,496,515 | 2/1950 | Bayes | 280/423 A |
| 2,919,928 | 1/1960 | Hoffer | 280/415 B |
| 3,620,551 | 11/1971 | Brown | 280/479 A |

FOREIGN PATENT DOCUMENTS

A79,461  10/1962  France ..................................... 280/493

*Primary Examiner*—John A. Pekar
*Attorney, Agent, or Firm*—Blanchard, Flynn, Thiel, Boutell & Tanis

[57] ABSTRACT

A semi-trailer is connected to an agricultural-type tractor by means of a coupling dolly. The coupling dolly has a chassis which is supported by wheels at its rear end and is connected to a weight transfer hitch at its front end. The semi-trailer is connected to the dolly by means of a universal coupling supported between the ends of the dolly chassis and having mutually intersecting rearwardly disposed pitching, rolling and yawing axes. The weight transfer hitch is pivotally connected to the tractor for articulation about a horizontal forwardly disposed pitching axis extending transversely of the tractor, between the axes of the front and rear wheels of the tractor and below the level of the axis of the rear wheels of the tractor. The weight transfer hitch also has bearing means, disposed to the rear of the horizontal forwardly disposed pitching axis, for accommodating rolling and yawing articulation between the dolly and the tractor, the bearing means provided for yawing articulation being disposed on an axis which passes through the bearing means provided for rolling articulation.

6 Claims, 2 Drawing Figures

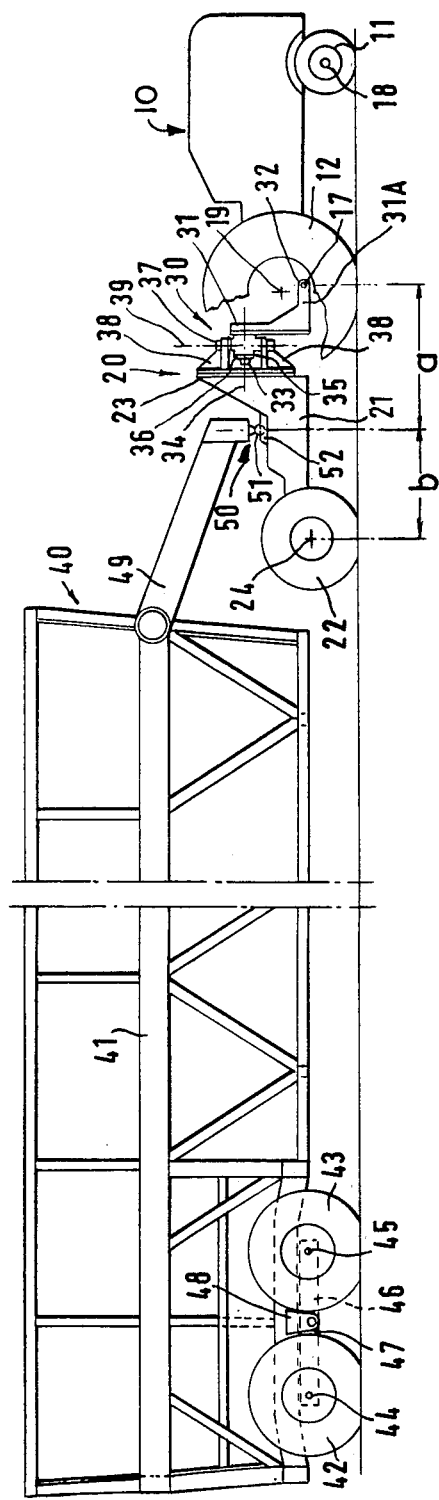
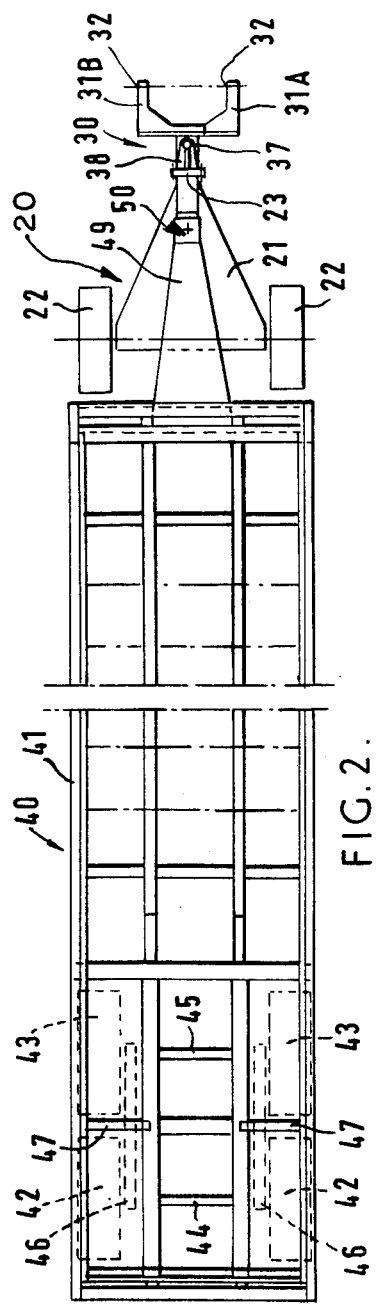
FIG. 1.
FIG. 2.

COUPLING DOLLY

BACKGROUND OF THE INVENTION

The invention relates to a coupling dolly for connecting a semi-trailer to an agricultural-type tractor.

The term "agricultural-type tractor" is used here and throughout the remainder of the specification to denote a tractor provided with fittings for the attachment of auxiliary equipment such as agricultural implements or, in industrial applications, material transporting means such as fork lifting apparatus. Such a tractor is distinguished from a road haulage tractor having a connnection for a semi-trailer, such as a fifth wheel connection, mounted above the level of the rear axle of the tractor and is suitable for connection to a semi-trailer by means of a weight transferring coupling hitch for pivotal movement of the semi-trailer about a horizontal pitching axis extending transversely of the tractor below the level of the rear axle of the tractor.

One disadvantage associated with the use of any weight transferring coupling to connect a semi-trailer to an agricultural-type tractor is that the load bearing capacity of the rear axle of the tractor is limited by the manufacturer's specifications. Thus, although a weight transferring coupling can be used to enhance the tractive effort of the tractor, the load carrying capacity of the tractor imposes a limit on the load carried by the semi-trailer.

When coupling a semi-trailer directly to an agricultural-type tractor, it is possible to use a weight transferring coupling which is connected to the tractor by means of first bearing means which allow pivotal movement between the tractor and the coupling about the pitching axis which is disposed below the level of the rear axle of the tractor and this ensures that the horizontal load transmitted from the semi-trailer to the tractor acts so as to press all the wheels of the tractor more firmly on to the supporting surface.

This is important for tractive efficiency and steering control when hauling a heavy semi-trailer by means of a light-weight agricultural-type tractor.

Moreover, in order to allow relative rolling movement between the tractor and the semi-trailer about a longitudinally-extending horizontal rolling axis, so as to prevent overturning forces from being transmitted from the semi-trailer to the tractor, when travelling along a straight-line path, it is possible to use a specialised form of weight transferring coupling in the form of a weight transfer hitch which is provided with second bearing means for rolling articulation between the tractor and the semi-trailer. For constructional reasons, it is preferable to mount these second bearing means at or adjacent third bearing means for yawing articulation between the tractor and the semi-trailer about a vertical axis which must be sited to the rear of the first bearing means to allow pitching articulation between the tractor and the semi-trailer without fouling engagement between the rear of the tractor and the weight transfer hitch.

One disadvantage of such a weight transfer hitch is that, as the longitudinal axis of the tractor turns about the third bearing means on the vertical yawing axis, relative to the longitudinal axis of the semi-trailer, progressively more rolling articulation between the two vehicles is able to take place about the first bearing means on the horizontal pitching axis and progressively more pitching articulation between the vehicles is able to take place about the second bearing means on the rolling axis and this results in a reduction of the rolling stability of the semi-trailer.

Thus, when the tractor and semi-trailer are disposed on a straight-line path, with their longitudinal axes in alignment in a common vertical plane, or parallel in two parallel vertical planes, the weight of the semi-trailer and its load are supported at three points, where the wheels of the semi-trailer bear on the supporting surface and at the second bearing means. These three points define a triangular plane of support which is normally in the shape of an isosceles triangle. Rolling stability can therefore be increased by raising the second bearing means as high as possible so that the height of the centre of gravity of the semi-trailer and its load above the triangular plane of support is as small as possible or, preferably, so that the centre of gravity is disposed below the triangular plane of support. However, as the longitudinal axis of the tractor turns in at least one direction about the third bearing means on the vertical yawing axis, relative to the longitudinal axis of the semi-trailer, the apex of the triangular plane of support moves laterally and downwardly towards the horizontal pitching axis through the first bearing means, causing a two-fold reduction in the rolling stability of the semi-trailer.

This reduction in rolling stability is proportional to the difference in height between the horizontal rolling axis of the second bearing means and the horizontal pitching axis of the first bearing means and, hence, upon the rolling stability of the semi-trailer when the longitudinal axes of the tractor and the semi-trailer are in alignment in a common vertical plane, or parallel in two parallel vertical planes. The reduction in rolling stability of the semi-trailer is also proportional to the lateral movement of the apex of the triangle of support and, hence, upon the distance between the horizontal pitching axis and the second bearing means at or adjacent the third bearing means defining the vertical yawing axis. However, to allow for adequate pitching movement between the semi-trailer and the tractor, it is difficult to reduce this distance between the horizontal pitching axis and the vertical yawing axis by much below 60cm.

Of course, the rolling stability of a semi-trailer could be increased by mounting the semi-trailer axle away from the rear end of the semi-trailer, towards the centre of gravity of the loaded semi-trailer, but this would involve either obstruction or elevation of the load bearing platform to accommodate this axle, and even this improved rolling stability would be reduced during turning, as hereinbefore described. Thus, even though it is possible to increase the rolling stability of the semi-trailer by providing a weight transfer hitch with elevated second bearing means, this involves the use of a weight transfer hitch of very robust and, consequently, expensive construction.

In any case, the increased rolling stability obtained is inevitably reduced when the vertical planes containing the longitudinal axes of the tractor and the semi-trailer are inclined to each other and, if the height of the second bearing means is increased beyond a certain point, this adversely affects the stability of the tractor when the semi-trailer is travelling up or down an incline and the tractor is not longitudinally aligned with the semi-trailer.

It is for this reason that weight transfer hitches such as this have not previously been considered for use on a coupling dolly in the form of a semi-trailer for connecting a load-carrying semi-trailer to an agricultural-type tractor, even though it is known to connect a load-carrying semi-trailer to a tractor by means of a coupling dolly having a conventional fifth-wheel weight transferring coupling with bearing means, which allow pitching rolling and yawing articulation between the tractor and the dolly, arranged together above the level of the rear axle of the tractor so as to ensure that the shape of the support triangle for the coupling dolly remains constant while the loading transferred to the rear axle of the tractor, through the fixed apex of the support triangle, does not exceed the manufacturer's specifications.

SUMMARY OF THE INVENTION

The object of the present invention is to provide means for connecting a semi-trailer to an agricultural-type tractor which mitigates or avoids these difficulties and, in particular, provides greater rolling stability and greater load carrying capacity for the semi-trailer.

According to the invention, there is provided a coupling dolly, for connecting a semi-trailer to an agricultural-type tractor, as hereinbefore defined, comprising a chassis, support surface engaging rolling means such as wheels or endless tracks supporting the rear end of the chassis, universal coupling means disposed between the front and rear ends of the chassis for connection to complementary means on a semi-trailer to allow articulation between the semi-trailer and the dolly about three mutually perpendicular rearwardly disposed pitching, rolling and yawing axes, a weight transfer hitch connected to the front end of the chassis for attachment to the agricultural-type tractor, the weight transfer hitch having connecting means for connecting the dolly to the tractor for pivotal articulation about a horizontal forwardly disposed pitching axis extending transversely of the tractor, characterised in that the connecting means of the weight transfer hitch are disposed below the level of the axis of the rear wheels of the tractor, and in that the weight transfer hitch having has rolling and yawing bearing means, disposed rearwardly of the horizontal forwardly disposed pitching axis, for permitting rolling and yawing articulation between the tractor and the dolly, with the yawing bearing means disposed on a forwardly disposed yawing axis which passes through the rolling bearing means of the weight transfer hitch so as to enhance rolling stability for the coupling dolly.

A semi-trailer connected to an agricultural-type tractor by means of a coupling dolly according to the invention is thus provided with a triangular plane of support which retains its isosceles shape regardless of the inclination between the longitudinal axis of the tractor and the semi-trailer, because the apex of the triangle remains fixed at the vertical axis through the universal coupling means mounted on the chassis of the dolly. As a result, the rolling stability of the semi-trailer is not reduced when vertical planes containing the longitudinal axes of the tractor and the semi-trailer are inclined to each other and so it is possible to obtain adequate rolling stability for the semi-trailer with a triangular plane of support having an apex which is much lower than is necessary when the semi-trailer is connected directly to the tractor, by means of the weight transfer hitch. The rolling axis of the universal coupling means connecting the semi-trailer to the dolly may therefore be disposed below the rolling axis of the bearing means of the weight transfer hitch.

This means that the point of application of the load carried by the dolly, at the apex of the triangular plane of support of the semi-trailer, can be lowered to a height which is less than the centre of gravity of a loaded semi-trailer connected directly to the tractor by means of the weight transfer hitch. This, in turn, ensures that the dolly has a greater rolling stability than a loaded semi-trailer coupled directly to the tractor. Moreover, during turning, when it is necessary for vertical planes containing the longitudinal axes of the tractor and the semi-trailer to be inclined to each other, at a particular angle, vertical planes containing the longitudinal axes of the tractor and the coupling dolly will be inclined to each other at a smaller angle and so the reduction in rolling stability resulting from the turn will be less than that of a semi-trailer coupled directly to the tractor.

The resultant two-fold improvement in the rolling stability of the semi-trailer is also accompanied by an increase in the load carrying capacity of the semi-trailer in that the forward end of the semi-trailer is supported by the wheels of the coupling dolly and by the tractor. Thus, the loading on the chassis of the coupling dolly is shared by the wheels of the dolly and the wheels of the tractor and the loading on the axles of the tractor can be kept within the manufacturer's specifications even when the semi-trailer is loaded much more heavily than would be possible if the semi-trailer were coupled directly to the tractor. Moreover, if the pitching axis is disposed between the axes of the front and rear wheels of the tractor, the vertical loading transmitted from the semi-trailer to the tractor, as well as the horizontal loading, acts to press all four wheels of the tractor more firmly on to the supporting surface.

The universal coupling means mounted on the chassis of the coupling dolly may be of conventional construction such as the ball or socket of a ball and socket joint.

Similarly, the weight transfer hitch may also be of conventional construction, but in a preferred construction of the coupling dolly, to provide improved rolling stability, the weight transfer hitch consists of a vehicle coupling, as described and claimed in U.S. Pat. No. 3,951,435.

This U.S. patent describes and claims a vehicle coupling in which a first member is pivotally connectable to a first vehicle so as to be pivotable about a horizontal transverse axis, a second member is rigidly connectable to a second, trailer vehicle, and first and second pivot means having perpendicularly intersecting pivotal axes lying in a plane extending perpendicular to the horizontal transverse axis to accommodate relative rolling and yawing movement between the first and second vehicles are mounted on the first member so that, in use of the coupling, the first and second pivot means are disposed above the horizontal transverse axis and support connecting means for connection of the first member to the second member, one of the pivot means comprising a first bearing journalled on a central spindle and the other pivot means comprising two second bearings respectively journalled on outer spindles disposed on opposite sides of the first bearing along a common axis which is substantially vertical when the first and second vehicles are coupled together and which passes diametrically through the central region of the first bearing.

Thus, a coupling dolly according to the present invention may be provided with a weight transfer hitch in which a first member is pivotally connectable to an agricultural-type tractor by first bearing means so as to be pivotable about the horizontal pitching axis, a second member is rigidly connected to the coupling dolly, and second and third bearing means having perpendicularly intersecting pivotal axes lying in a plane extending perpendicular to the horizontal pitching axis to accommodate relative rolling and yawing movement between the tractor and the coupling dolly are mounted on the first member so that, in use of the coupling dolly, the second and third bearing means are disposed above the horizontal pitching axis and support connecting means for connection of the first member to the second member, the second bearing means comprising a bearing forming part of a cruciform bearing assembly journalled on a central spindle and the third bearing means comprising two bearings which form parts of the cruciform bearing assembly and are respectively journalled on outer spindles disposed, on opposite sides of the bearing journalled on the central spindle, along a common axis which is substantially vertical when the tractor and the coupling dolly are coupled together and which passes diametrically through the central region of the bearing journalled on the central spindle. With a weight transfer hitch such as this, it is possible to reduce the horizontal distance between the first bearing means defining the horizontal pitching axis and the second bearing means defining the rolling axis to thereby minimise the reduction in rolling stability when the longitudinal axis of the tractor and the coupling dolly are inclined to each other, even when the pitching axis is disposed between the axes of the front and rear wheels of the tractor.

In order to ensure that the horizontal distance between first and second bearing means is reduced to a minimum, the connecting means may be disposed in their entirety on the opposite side of the second and third bearing means to the first bearing means.

DESCRIPTION OF THE DRAWINGS

A coupling dolly according to the invention is hereinafter described, by way of example, with reference to the accompanying drawings, in which:

FIG. 1 is a side elevation of a vehicle assembly in which a semi-trailer is coupled to an agricultural-type tractor by means of a coupling dolly according to the invention; and FIG. 2 is a plan view of the semi-trailer and coupling dolly shown in FIG. 1.

DESCRIPTION OF THE ILLUSTRATIVE EMBODIMENTS

As shown in the drawings, an agricultural-type tractor 10 provided with front wheels 11 and rear wheels 12 is connected by means of a coupling dolly 20 having a weight transfer hitch 30 to a semi-trailer 40. The dolly 20 is provided with a chassis 21 mounted, at its rear end, on wheels 22 and connected, at its front end, to the weight transfer hitch 30.

The semi-trailer 40 is provided with a load-bearing frame 41 which is supported at its rear end on two sets of wheels 42 and 43 respectively mounted symmetrically of the longitudinal axis of the trailer 40 at opposite ends of axles 44 and 45. The axles 44 and 45 are supported at their ends by the opposite ends of two walking beams 46 which are pivotally supported at their centres on axles 47 mounted in brackets 48 connected to the bottom of the semi-trailer frame 41. A draw bar 49 is rigidly secured to the front and of the semi-trailer frame 41 and is connected to the chassis 21 of the coupling dolly by means of a ball and socket joint 50. The ball member 51 of the ball and socket joint 50 is carried at the front end of the draw bar 49 and seats in a member 52 carried by the dolly chassis 21 and forming the socket portion of the ball and socket joint 50.

As shown in FIG. 1, the weight transfer hitch 30 has a first member 31 in the form of an A-frame having two legs 31A and 31B carrying, at their extremeties, first bearing means 32 pivotally connecting the weight transfer hitch 30 to the tractor 10 for pitching articulation about a horizontal transverse axis 17 disposed between the axes 18 and 19 of the front and rear wheels 11 and 12 of the tractor 10 and below the level of the axis 19 of the rear wheels 12. A spindle 33 projecting rearwardly from the upper end of the A-frame 31, on a horizontal rolling axis 34, carries a cruciform bearing assembly 35 which is journalled on the spindle 33 and supported against rearward movement along this spindle 33 by means of a thrust collar 36 so as to provide second bearing means for rolling articulation about the axis 34 between the coupling dolly 20 and the tractor 10. The cruciform bearing assembly 35 is also journalled on two spindles 37 carrying brackets 38 which are bolted to a flange 23 provided on the front end of the dolly chassis 21. As shown, the spindles 37 are aligned on a vertical axis 39 passing through the central region of the cruciform bearing assembly 35 so as to provide for yawing articulation between the coupling dolly 20 and the tractor 10. As also shown, because the rolling and yawing axes 34 and 39 provided by the cruciform bearing assembly 35 are disposed rearwardly of the pitching axis 17, it is possible to position the rolling axis 34 above the level of the rolling axis of the ball and socket joint 50.

In use of the assembly shown in FIG. 1, the ball and socket joint 50 is positioned so as to divide the distance between the pitching axis 17 and the axis 24 of the wheels 22 of the coupling dolly 20 in the ratio $a : b$. This means that the loading on the trailer 40 which is transferred to the dolly 20 is divided in the ratio $a : b$ between the wheels 22 of the dolly 20 and the loading transferred to the tractor 10. Clearly, in view of the proximity of the pitching axis 17 to the axis 19 of the rear wheels 12 of the tractor 10, this loading on the tractor 10 is carried almost entirely by the rear wheels 12. Thus, the position of the ball and socket joint 50 may be chosen so that the loading on the rear wheels 12 of the tractor 10 is within the tractor manufacturer's specifications and the remainder of the load transferred from the semi-trailer 40 is carried by the wheels 22 of the dolly 20. This loading on the wheels 22 may therefore be increased to the maximum permitted by civil regulations and the loading on the trailer 40 can be increased until all of the wheels 12, 22, 42 and 43 bear their maximum permitted loads.

With this form of construction, the triangular plane of support of the semi-trailer 40 remains, at all times, in the shape of an isosceles triangle having its apex at the centre of the ball 51 of the ball and socket joint 50 so that it is unnecessary to elevate the ball and socket joint 50 to counteract any reduction in rolling stability of the semi-trailer 40 when vertical planes containing the longitudinal axes of the tractor 10 and the semi-trailer 40 are inclined to each other during turning. Moreover, as a consequence of the relatively small height of the rolling axis provided by the ball and socket joint 50 which is disposed below the level of the rolling axis 34 of the cruciform bearing assembly 35 the height of the rolling axis 34 can be less than the height of the centre of gravity of the loaded semi-trailer 40 without unduly impairing the rolling stability of the semi-trailer 40. Any resultant reduction in the rolling stability of the coupling dolly 20 is offset by the fact that the coupling dolly 20 is only required to undergo limited turning about the vertical yawing axis 39 through the spindles 37, relative to the tractor 10.

In the foregoing description of the invention, the rolling stability of a trailing vehicle coupled to a leading vehicle has been described with reference to a plane of support which is in the shape of an isosceles triangle when the longitudinal axes of the coupled vehicles are in alignment. However, the invention is also applicable to vehicle assemblies which have longitudinal axes which are laterally offset from each other so that, when the vehicles are on a straight-line path, their longitudinal axes extend parallel to each other, without occupying the same vertical plane. In this case, for example, a semi-trailer having a plane of support in the shape of a non-isosceles triangle would, as already explained, have constant rolling stability during turning because the apex of the triangular plane of support would not be subject to any lateral and downward displacement relative to the other apices of the plane of support. If the vertical yawing axis of the weight transfer hitch of a coupling dolly, according to the invention, was laterally offset from the longitudinal axis of the tractor, lateral and downward displacement of the apex of the triangular plane of support would still occur whenever there was angular movement between the longitudinal axes of the tractor and the coupling dolly, in one direction. On angular movement between these axes, in the opposite direction, there could be some initial improvement in the rolling stability of the coupling dolly as the shape of the triangular plane of support was transformed more into an isosceles triangle. However, this improvement would be offset, to some extent, by concurrent lowering of the apex of the plane of support. Moreover, on increased angular movement of the longitudinal axes of the tractor and the coupling dolly, beyond the configuration of maximum rolling stability, the rolling stability of the coupling dolly would begin to decrease again, in the manner described.

Having defined my invention, I claim:

1. A vehicle assembly comprising an agricultural-type tractor, a coupling dolly connected to said tractor and a load-carrying semi-trailer connected to said coupling dolly, in which:

said tractor has front and rear wheels and pitching bearing means defining a horizontal forwardly disposed pitching axis extending transversely of the tractor below the level of the axis of the rear wheels of the tractor;

said coupling dolly has a chassis having front and rear ends, support surface engaging rolling means supporting the rear end of the chassis, a weight transfer hitch connected to the front end of the chassis and first universal coupling means mounted on the chassis between the front and rear ends of the chassis; and said semi-trailer has a load bearing frame having front and rear ends, support surface engaging rolling means supporting the rear end of the frame, a draw bar projecting forwardly of the front end of the frame, and second universal coupling means which are mounted on the front end of the draw bar and cooperate with the first universal coupling means to connect the semi-trailer to the coupling dolly for pivotal articulation about mutually perpendicular rearwardly disposed pitching, rolling and yawing axes;

the weight transfer hitch having first bearing means which cooperate with the pitching bearing means of the tractor to connect the coupling dolly to the tractor for pitching articulation about said forwardly disposed pitching axis, and second and third interconnected bearing means disposed rearwardly of the forwardly disposed pitching axis for respectively permitting rolling and yawing articulation between the tractor and the coupling dolly, the third bearing means permitting yawing articulation being disposed on a forwardly disposed yawing axis which passes through the second bearing means permitting rolling articulation about a forwardly disposed rolling axis so as to enhance rolling stability for the coupling dolly.

2. A vehicle assembly, according to claim 1, in which:

the weight transfer hitch comprises a first member, which is pivotally connected to the tractor by the first bearing means cooperating with the pitch bearing means on the tractor, a second member rigidly connected to the front end of the dolly chassis and means, carried by the third bearing means, connecting the first member to the second member;

the second bearing means comprise a central spindle projecting rearwardly from the first member to provide the forwardly disposed horizontal rolling axis, above the level of the rearwardly disposed rolling axis of the first and second universal coupling means, a rolling bearing journalled on the central spindle, and means securing the rolling bearing against axial movement along the central spindle; and the third bearing means comprise two vertically extending outer spindles disposed on the opposite sides of the rolling bearing along the forwardly disposed yawing axis which passes diametrically through the central region of the rolling bearing and the two yawing bearings respectively journalled on the two outer spindles.

3. A vehicle coupling, according to claim 1, in which the forwardly disposed rolling axis of the second bearing means of the weight transfer hitch is disposed above the rearwardly disposed rolling axis of the first and second universal coupling means.

4. A vehicle coupling according to claim 1, wherein the rolling and yawing axes as respectively defined by said second and third bearing means are perpendicular with respect to one another and intersect at a point positioned centrally of said second bearing means for minimizing the horizontal longitudinal spacing between said last-mentioned rolling axis and said forwardly disposed pitching axis.

5. A vehicle assembly according to claim 4, wherein said second and third bearing means define a cruciform-shaped bearing structure which in turn defines said forwardly disposed yawing and rolling axes, said latter-mentioned axes intersecting at a point disposed centrally of said cruciform-shaped bearing structure.

6. A vehicle assembly comprising an agricultural-type tractor, a coupling dolly connected to said tractor and a load-carrying semi-trailer connected to said coupling dolly, in which:

said tractor has front and rear wheels and pitching bearing means defining a horizontal forwardly disposed pitching axis disposed between the axes of the front and rear wheels of the tractor and extending transversely of the tractor below the level of the axis of said rear wheels;

said coupling dolly has a chassis having front and rear ends, support surface engaging rolling means supporting the rear end of the chassis, a weight transfer hitch connected to the front end of the chassis and first universal coupling means mounted on the chassis between the front and rear ends of the chassis; and said semi-trailer has a load bearing frame having front and rear ends, support surface engaging rolling means supporting the rear end of the frame, a draw bar projecting forwardly of the front end of the frame, and second universal coupling means which are mounted on the front end of the draw bar and cooperate with the first universal coupling means to form a ball-and-socket joint which connects the semi-trailer to the coupling dolly for pivotal articulation about mutually intersecting rearwardly disposed pitching rolling and yawing axes;

the weight transfer hitch having first bearing means which cooperate with the pitching bearing means of the tractor to connect the coupling dolly to the tractor for pitching articulation about said forwardly disposed pitching axis, second bearing means for permitting rolling articulation between the tractor and the coupling dolly about an axis which is disposed above the rearwardly disposed rolling axis provided by the ball-and-socket joint connecting the semi-trailer to the coupling dolly, and third bearing means connected to the second bearing means for permitting yawing articulation between the tractor and the coupling dolly.

* * * * *

UNITED STATES PATENT AND TRADEMARK OFFICE
CERTIFICATE OF CORRECTION

PATENT NO. : 4 106 791
DATED : August 15, 1978
INVENTOR(S) : Robert Johnson Greatbatch It is certified that error appears in the above-identified patent and that said Letters Patent are hereby corrected as shown below:

Column 8, line 19; change "pitch" to ---pitching---.

Column 10, line 3; after "pitching" insert ---,--- (comma).

Signed and Sealed this

Sixth Day of February 1979

[SEAL]

Attest:

RUTH C. MASON
*Attesting Officer*

DONALD W. BANNER
*Commissioner of Patents and Trademarks*